United States Patent
Hwang et al.

(10) Patent No.: US 7,372,793 B2
(45) Date of Patent: May 13, 2008

(54) METHOD OF AND APPARATUS FOR MANAGING DISC DEFECTS USING TEMPORARY DEFECT MANAGEMENT INFORMATION (TDFL) AND TEMPORARY DEFECT MANAGEMENT INFORMATION (TDDS), AND DISC HAVING THE TDFL AND TDDS

(75) Inventors: Sung-hee Hwang, Seoul (KR); Jung-wan Ko, Gyeonggi-do (KR); Kyung-geun Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 78 days.

(21) Appl. No.: 11/045,149

(22) Filed: Jan. 31, 2005

(65) Prior Publication Data
US 2005/0128904 A1   Jun. 16, 2005

Related U.S. Application Data

(63) Continuation of application No. 10/670,363, filed on Sep. 26, 2003.

(30) Foreign Application Priority Data

Oct. 18, 2002  (KR)  ............................... 2002-63850
Dec. 13, 2002  (KR)  ............................... 2002-79755

(51) Int. Cl.
*G11B 7/00*  (2006.01)
(52) U.S. Cl. ................................. 369/53.15
(58) Field of Classification Search ............... 369/47.1, 369/53.1, 53.12, 53.13, 53.15, 53.17, 53.14
See application file for complete search history.

(56) References Cited

U.S. PATENT DOCUMENTS

| | | | |
|---|---|---|---|
| 4,949,326 A | 8/1990 | Takagi et al. | |
| 5,111,444 A | 5/1992 | Fukushima et al. | |
| 5,202,876 A | 4/1993 | Takagi et al. | |
| 5,212,677 A | 5/1993 | Shimote et al. | |
| 5,553,045 A | 9/1996 | Obata | |
| 5,859,823 A | 1/1999 | Yamamuro | |
| 6,385,148 B2 | 5/2002 | Ito et al. | |
| 6,564,345 B1 * | 5/2003 | Kim et al. | 714/723 |
| 6,594,209 B2 * | 7/2003 | Ijtsma et al. | 369/47.14 |
| 6,606,285 B1 * | 8/2003 | Ijtsma et al. | 369/47.1 |

(Continued)

OTHER PUBLICATIONS

U.S. Appl. No. 10/638,560, filed Aug. 12, 2003, Jung-wan Ko, et al., Samsung Electronics Co., Ltd.

(Continued)

*Primary Examiner*—Nabil Hindi
(74) *Attorney, Agent, or Firm*—Stein, McEwen & Bui, LLP

(57) ABSTRACT

A disc having an updatable defect management area used by an apparatus for managing defects on the disc, the disc including a user data area which includes user data, a spare area that is a substitute area for a defect existing in the user data area, and an area in which are recorded an address of data that is last recorded in the user data area and an address of a replacement data recorded in the spare area. Accordingly, the disc defect management method and apparatus are applicable to a recordable disc such as a write-once disc while effectively using a defect management area of the disc.

5 Claims, 12 Drawing Sheets

U.S. PATENT DOCUMENTS

2004/0223440 A1    11/2004   Park
2005/0128904 A1     6/2005   Hwang et al.

OTHER PUBLICATIONS

U.S. Appl. No. 10/638,481, filed Aug. 12, 2003, Jung-wan Ko, et al., Samsung Electronics Co., Ltd.
U.S. Appl. No. 10/663,981, filed Sep. 17, 2003, Jung-wan Ko, et al., Samsung Electronics Co., Ltd.
U.S. Appl. No. 10/638,555, filed Aug. 12, 2003, Jung-wan Ko, et al., Samsung Electronics Co., Ltd.
U.S. Appl. No. 11/430,880, filed May 10, 2006, Hwang et al.
U.S. Appl. No. 11/430,881, filed May 10, 2006, Hwang et al.
U.S. Appl. No. 11/430,883, filed May 10, 2006, Hwang et al.

* cited by examiner

METHOD OF AND APPARATUS FOR MANAGING DISC DEFECTS USING TEMPORARY DEFECT MANAGEMENT INFORMATION (TDFL) AND TEMPORARY DEFECT MANAGEMENT INFORMATION (TDDS), AND DISC HAVING THE TDFL AND TDDS

CROSS-REFERENCE TO RELATED APPLICATIONS

This application is a continuation of U.S. patent application Ser. No. 10/670,363, filed Sep. 26, 2003, currently pending, which claims the benefit of Korean Patent Application No. 2002-63850, filed on Oct. 18, 2002 in the Korean Intellectual Property Office, and Korean Patent Application No. 2002-79755 filed on Dec. 13, 2002 in the Korean Intellectual Property Office, the disclosures of which are incorporated herein in their entirety by reference.

BACKGROUND OF THE INVENTION

1. Field of the Invention

The present invention relates to disc defect management, and more particularly, to a method of and apparatus for managing defects therein using a temporary defect management area (TDMA) and a disc having the TDMA for managing defects thereon.

2. Description of the Related Art

Disc defect management is the process of rewriting data stored in a user data area of a disc, in which a defect exists, to a new portion of the disc's data area, thereby compensating for a data loss otherwise caused by the defect. In general, disc defect management is performed using a linear replacement method or a slipping replacement method. In the linear replacement method, the user data area in which a defect exists is replaced with a spare data area having no defects. In the slipping replacement method, the user data area with the defect is slipped and the next user data area having no defects is used.

Both the linear replacement method and the slipping replacement are, however, applicable only to rewritable discs, such as a DVD-RAM/RW, on which data can be repeatedly recorded and recording can be performed using a random access method. In other words, the linear replacement and slipping replacement methods are difficult to apply to a write-once discs, on which recording is allowed only once.

In general, the presence of defects in a disc is detected by recording the data on the disc, and confirming whether data has been recorded correctly on the disc. However, once data is recorded on a write-once disc, it is impossible to overwrite new data and manage defects therein.

After the development of a CD-R and a DVD-R, a high-density write-once disc with a recording capacity of several dozen GBs was introduced. This type of disc can be used as a backup disc since it is not expensive and allows random access so as to enable fast reading operations. However, since disc defect management is not available for write-once discs, a backup operation may be discontinued when a defective area (i.e., an area where a defect exists) is detected during the backup operation. In addition, since a backup operation is generally performed when a system is not frequently used (e.g., at night when a system manager does not operate the system), it is more likely that the backup operation will be stopped and remain discontinued because a defective area of a write-once disc is detected.

SUMMARY OF THE INVENTION

The present invention provides a write-once disc on which defects are managed, and a disc defect management method and apparatus usable with the write-once disc.

The present invention also provides a write-once disc on which defects are managed and a disc defect management method and apparatus that can manage disc defects on the disc even when a defect is detected during a recording operation, allowing the recording operation to be performed without interruption.

Additional aspects and/or advantages of the invention will be set forth in part in the description which follows and, in part, will be obvious from the description, or may be learned by practice of the invention.

According to an aspect of the present invention, a disc includes a user data area in which user data is recorded; a spare area that includes a substitute area in which is recorded replacement data for a portion of the user data recorded in a defective area existing in the user data area; and an area in which there are recorded an address of data that is last recorded in the user data area and an address of replacement data recorded in the spare area.

According to an aspect, the disc further includes a temporary defect management area that includes temporary defect information and temporary defect management information recorded each recording operation so as to be used for disc defect management, wherein the temporary defect management area is an area that includes the address of the data last recorded in the user data area and the address of the replacement data recorded in the spare area.

According to another aspect of the present invention, a method of managing a defect in a disc includes recording user data in a user data area; again recording user data, which is recorded in a defective area of the user data area in which a defect exists, in a spare area of the disc so as to make replacement data for a portion of the user data recorded in the defective area; and recording an address of data, which is last recorded in the user data area, and an address of the replacement data, which is recorded in the spare area, in a temporary defect management area that is formed to perform disc defect management.

According to another aspect of the present invention, a recording and/or reproducing apparatus includes a recording/reading unit that records data on or reads data from a disc; and a controller that controls the recording/reading unit to record user data in a user data area of the disc; controls the recording/reading unit to again record a portion of the user data recorded in a defective area of the user data area as replacement data in a spare area; and controls the recording/reading unit to record an address of data, which is last recorded in the user data area, and an address of the replacement data, which is last recorded in the spare area, in a temporary defect management area that is formed to perform disc defect management.

BRIEF DESCRIPTION OF THE DRAWINGS

The above and/or other aspects and advantages of the present invention will become more apparent by describing in detail embodiments thereof with reference to the accompanying drawings in which.

DETAILED DESCRIPTION OF THE EMBODIMENTS

Figure 1:
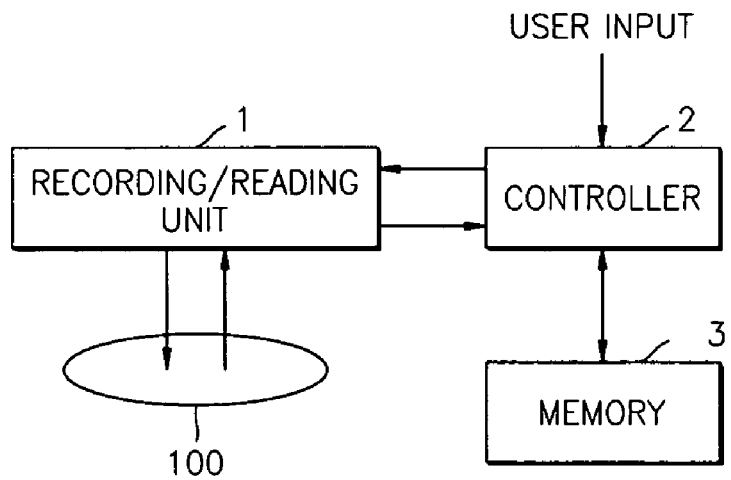
FIG. 1 is a block diagram of a recording apparatus according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram of a recording and/or reproducing apparatus according to an embodiment of the present invention. Referring to FIG. 1, the recording and/or reproducing apparatus includes a recording/reading unit 1, a controller 2, and a memory 3. The recording/reading unit 1 records data on a disc 100, which is an information storage medium according to an embodiment of the present invention, and reads back the data from the disc 100 to verify the accuracy of the recorded data. The controller 2 performs disc defect management according to an embodiment of the present invention.

In the shown embodiment, the controller 2 uses a verify-after-write method in which data is recorded on the disc 100 in predetermined units of data, and the accuracy of the recorded data is verified to detect if an area of the disc 100 has a defect. In other words, the controller 2 records user data on the disc 100 in units of recording operations, and verifies the recorded user data to detect an area of the disc 100 in which a defect exists. Thereafter, the controller 2 creates information that indicates the position of the area with the defect and stores the created information in the memory 3. When the amount of the stored information reaches a predetermined level or the verify-after-write operation is performed a predetermined number of times, the controller 2 records the stored information as temporary defect information on the disc 100.

According to an aspect of the invention, the recording operation is a unit of work determined according to a user's intention or is a recording work to be performed. According to the shown embodiment, a recording operation indicates a process in which the disc 100 is loaded into the recording and/or reproducing apparatus, data is recorded on the disc 100, and the disc 100 is taken out from the recording apparatus. However, it is understood that the recording operation can be otherwise defined.

During the recording operation, the user data is recorded and verified at least once. In general, while not required, data is recorded and verified several times. Defect information, which is obtained using the verify-after-write method, is temporarily stored as temporary defect information in the memory 3. When a user presses the eject button (not shown) of the recording and/or reproducing apparatus in order to remove the disc 100 after recording of data, the controller 2 expects the recording operation to be terminated. The controller 2 reads the information from the memory 3, provides it to the recording/reading unit 1, and controls the recording/reading unit 1 to record it on the disc 100.

When the recording of data is completed (i.e., additional data will not be recorded on the disc 100 and the disc 100 needs to be finalized), the controller 2 controls the recording/reading unit 1 to rewrite the recorded temporary defect information and temporary defect management information to a defect management area (DMA) of the disc 100 as defect management information.

During reproduction, the recording and/or reproducing apparatus utilizes the defect information and the defect management information in the defect management area and/or the temporary defect management area in order to access the recorded user data. While described in terms of a recording and/or reproducing apparatus as shown in FIG. 1, it is understood that the apparatus can be an individual recording or reproducing apparatus or a recording and reproducing apparatus.

Figure 2A:
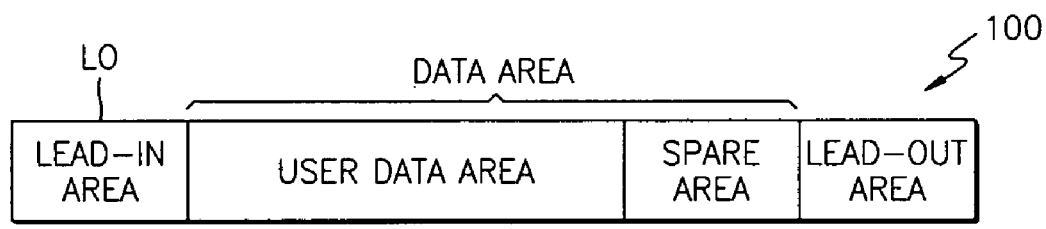
FIGS. 2A and 2B illustrate structures of a disc according to embodiments of the present invention.
Figure 2B:
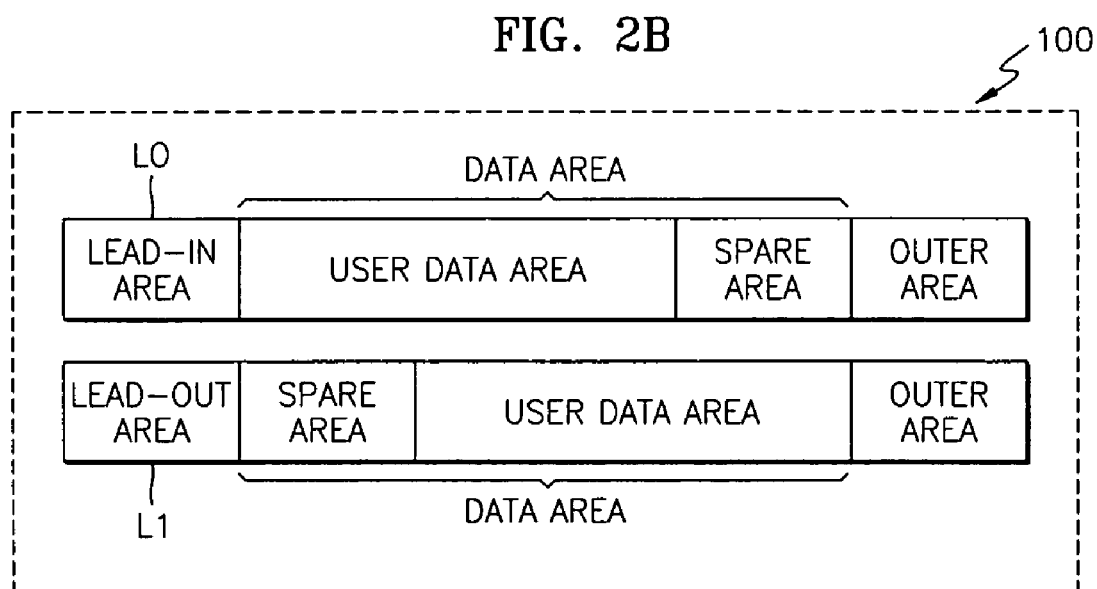

FIGS. 2A and 2B illustrate structures of the disc 100 of FIG. 1 according to embodiments of the present invention. FIG. 2A illustrates in detail a single record layer disc representation of disc 100 having a record layer L0. The disc 100 includes a lead-in area, a data area, and a lead-out area. The lead-in area is located in an inner part of the disc 100 and the lead-out area is located in an outer part of the disc 100. The data area is present between the lead-in area and the lead-out area and divided into a user data area and a spare area.

The user data area is an area where user data is recorded. The spare area is a replacement area for a user data area having a defect, serving to compensate for loss in the recording area due to the defect. On the assumption that defects may occur within the disc 100, it is preferable, but not required, that the spare area assumes about 5% of the entire data capacity of the disc 100, so that a greater amount of data can be recorded on the disc 100.

FIG. 2B illustrates a double record layer disc representation of disc 100 having two record layers L0 and L1. A lead-in area, a data area, and an outer area are sequentially formed from the inner part of the first record layer L0 to its outer part. Also, an outer area, a data area, and a lead-out area are sequentially formed from the outer part of the second record layer L1 to its inner part. Unlike the single record layer disc of FIG. 2A, the lead-out area is present at the second record layer L1 in the inner part of the disc 100 of FIG. 2B. That is, the disc 100 of FIG. 2B has an opposite track path (OTP) in which data is recorded starting from the lead-in area of the first record layer L0 toward the outer area of the first record layer L0 and continuing from the outer area of the second record layer L1 to the lead-out area of the second record layer L1. The spare area is allotted to each of the record layers L0 and L1 according to the shown embodiment, but need not be so allocated in all aspects of the invention.

In the shown embodiment, the spare areas are present between the user data area and the lead-out area and between the user data area and the outer area. If necessary, a portion of the user data area may be used as another spare area. That is, it is understood that more than one spare area may be present between the lead-in area and the lead-out area.

Figure 3A:
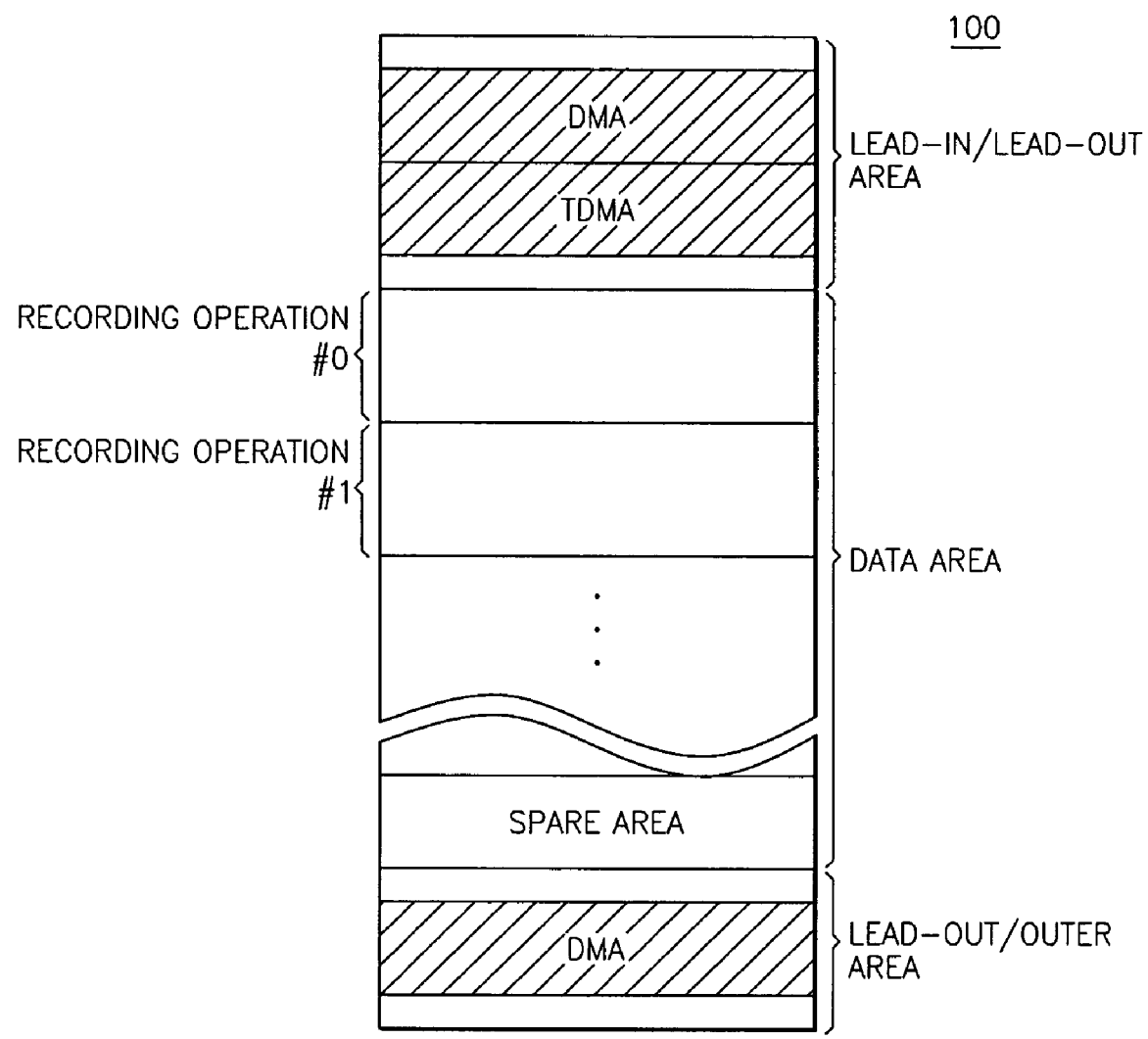
FIG. 3A illustrates data structures of the disc of FIGS. 2A and 2B according to an embodiment of the present invention.

FIG. 3A illustrates structures of the disc 100 of FIGS. 2A and 2B, according to an embodiment of the present invention. Referring to FIG. 3A, if the disc 100 is a single record layer disc, at least one DMA is present in the lead-in area and the lead-out area of the disc 100. Further, at least one temporary defect management area (TDMA) is also present in the lead-in area and the lead-out area. If the disc 100 is a double record layer disc, at least one DMA is present in the lead-in area, the lead-out area, and the outer area, and at least one TDMA is present in the lead-in area and the lead-out area. For the double record layer disc shown in FIG. 2B, the DMA and the TDMA are preferably formed in the lead-in area and the lead-out area, which are located in the inner part of the disc 100, respectively.

In general, the DMA includes information relating to managing disc defects in the disc 100. Such information includes the structure of the disc 100 for disc defect management, the recording position of defect information, whether defect management is performed, and the position and size of a spare area. For a write-once disc, when the above information changes, new data is recorded after previously recorded data.

Also, when the disc 100 is loaded into a recording/reading apparatus such as that shown in FIG. 1, the apparatus generally reads data from a lead-in area and a lead-out area of the disc 100 to determine how to manage the disc 100 and to record data on or read data from the disc 100. However, if the amount of data recorded in the lead-in area and/or the lead-out area increases, a longer time is spent on preparing the recording or reproducing of data after the loading of the disc 100.

To solve this problem and for other reasons, an aspect of the present invention uses temporary defect management information and temporary defect information that are to be recorded in a TDMA. The TDMA is allotted to the lead-in area and/or the lead-out area of a disc, being separated from the DMA. That is, only the last recorded defect information and the last recorded defect management information, which are required to perform disc defect management, are recorded in the DMA. As such, the amount of information that the recording/reading unit requires for a recording/reproducing operation is reduced.

In the shown embodiment, since disc defect management is performed using the linear replacement method, the temporary defect information includes defect position information indicating a position of an area of the disc 100 having a defect and replacement position information indicating a position of an area of the disc 100 on which is stored replacement data. The replacement data is data to replace a portion of the user data recorded in a defective area of the user data area. While not required, it is preferable that the temporary defect information further includes information indicating whether the area having the defect is a single defect block or a continuous defect block.

The temporary defect management information is used to manage the temporary defect information and includes information indicating a position of the disc 100 where the temporary defect information is recorded. While not required, it is preferable that the temporary defect management information further includes information indicating a position of user data that is last recorded in the user data area and a replacement area that is last formed in a spare area. Detailed data structures of temporary defect information and temporary defect management information will be explained below.

In the shown embodiment, the temporary defect information and temporary defect management information are recorded every time a recording operation ends. In the TDMA, information regarding a defect, which occurs in data recorded during recording operation #0, and information regarding a replacement area are recorded as temporary defect information #0. Information regarding a defect, which occurs in data recorded during recording operation #1, and information regarding a replacement area are recorded as temporary defect information #1. Further, information for managing temporary defect information #0, #1 is recorded as temporary defect management information #0, #1 in the TDMA. When additional data cannot be recorded in the data area or a user does not wish to record additional data therein (i.e., the data needs to be finalized), temporary defect information recorded in a temporary defect information area and temporary defect management information recorded in a temporary defect management information area are rewritten to the DMA.

The temporary defect information and the temporary defect management information are rewritten to the DMA for at least the following reason. Where additional data will not be recorded on the disc 100 (i.e., the disc 100 needs to be finalized), only last recorded ones of the temporary defect management information and temporary defect information, which have been updated several times, are again recorded in the DMA. Thus, the recording/reading unit 1 can read fast defect management information from the disc 100 just by reading the last recorded defect management information, thereby enabling fast initializing of the disc 100. Further, recording of the temporary defect information and temporary defect management information in the DMA increases the reliability of information.

In the shown embodiment, defect information contained in previously recorded temporary defect information #0, #1, #2 and #i−1 is further contained in temporary defect information #i. Thus, it is easy to finalize the disc 100 just by reading defect information contained in last recorded temporary defect information #i and to rewrite the read defect information to the DMA.

In the case of a high-density disc with a recording capacity of several dozens of GBs, it is desirable that a cluster is allocated to an area in which temporary defect management information #i is recorded, and four to eight clusters are allocated to an area in which temporary defect information #i is recorded. This is because it is generally preferable to record new information in units of clusters to update information when a minimum physical unit of record is a cluster, although the amount of temporary defect information #i is just several KBs. A total amount of defects allowed in a disc is preferably about 5 percent of the disc recording capacity. For instance, about four to eight clusters are required to record temporary defect information #i, considering that information regarding a defect is about 8 bytes long and the size of a cluster is 64 KBs long.

The verify-after-write method can also be performed on temporary defect information #i and temporary defect management information #i according to an aspect of the invention. When a defect is detected, information recorded in an area of a disc having a defect may be either recorded in a spare area using the linear replacement method, or recorded in an area adjacent to the TDMA using the slipping replacement method.

Figure 3B:
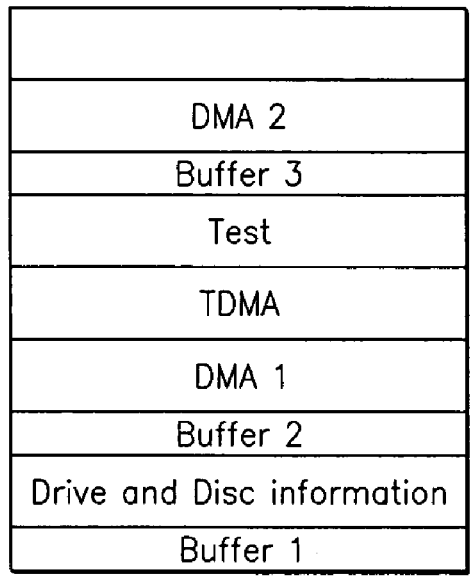
FIG. 3B illustrates a data structure of a disc with defect management areas (DMAs) and a temporary DMA (TDMA) as shown in FIG. 3A.

FIG. 3B illustrates a data structure of the disc 100 with a TDMA and DMAs as shown in FIG. 3A. If the disc 100 is a single record layer as shown in FIG. 2A, the TDMA and the DMA are present in at least one of a lead-in area and a lead-out area of the disc 100. If the disc is a double record layer disc 100 as shown in FIG. 2B, the TDMA and the DMA are present in at least one of a lead-in area, a lead-out area, and an outer area. While not required, it is preferable that the TDMA and the DMA are present in the lead-in area and the lead-out area, respectively.

Referring to FIG. 3B, two DMAs are formed to increase the robustness of defect management information and defect information. In FIG. 3B, the disc 100 includes a temporary defect management area (TDMA), a Test area in which recording conditions of data are measured, a Drive and Disc information area in which information regarding a drive used during a recording and/or reproducing operation(s) and disc information indicating whether a disc is a single record layer disc or a double record layer are recorded, and Buffer 1, Buffer 2, and Buffer 3 areas that act as buffers that indicate borders of the respective areas.

Figure 4A:
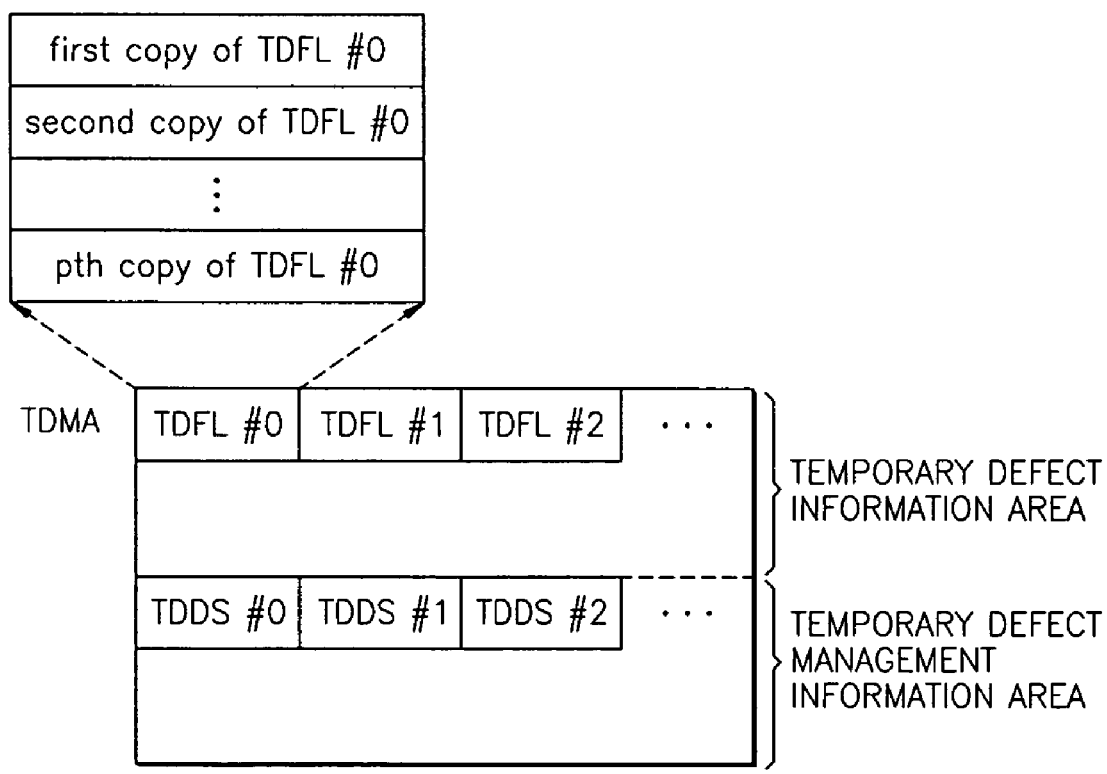
FIGS. 4A through 4D illustrate data structures of a TDMA according to embodiments of the present invention.

FIGS. 4A through 4D illustrate data structures of a TDMA according to embodiments of the present invention. Referring to FIG. 4A, a TDMA is logically divided into a temporary defect information area and a temporary defect management information area. In the shown embodiment of the temporary defect information area, temporary defect information TDFL #0, TDFL #1, TDFL #2 are sequentially recorded starting from a start of this area toward an end of the area. The temporary defect information TDFL #0, TDFL #1, TDFL #2, . . . are repeatedly recorded several times to increase the robustness of the information. In particular, FIG. 4A illustrates recording of the temporary defect information TDFL #0 P times.

In the temporary defect management information area, temporary defect management information TDDS #0, TDDS #1, TDDS #2 are sequentially recorded starting from a start of this area. The temporary defect management information TDDS #0, TDDS #1, and TDDS #2 correspond to the temporary defect information TDFL #0, TDFL #1, and TDFL #2, respectively.

Figure 4B:
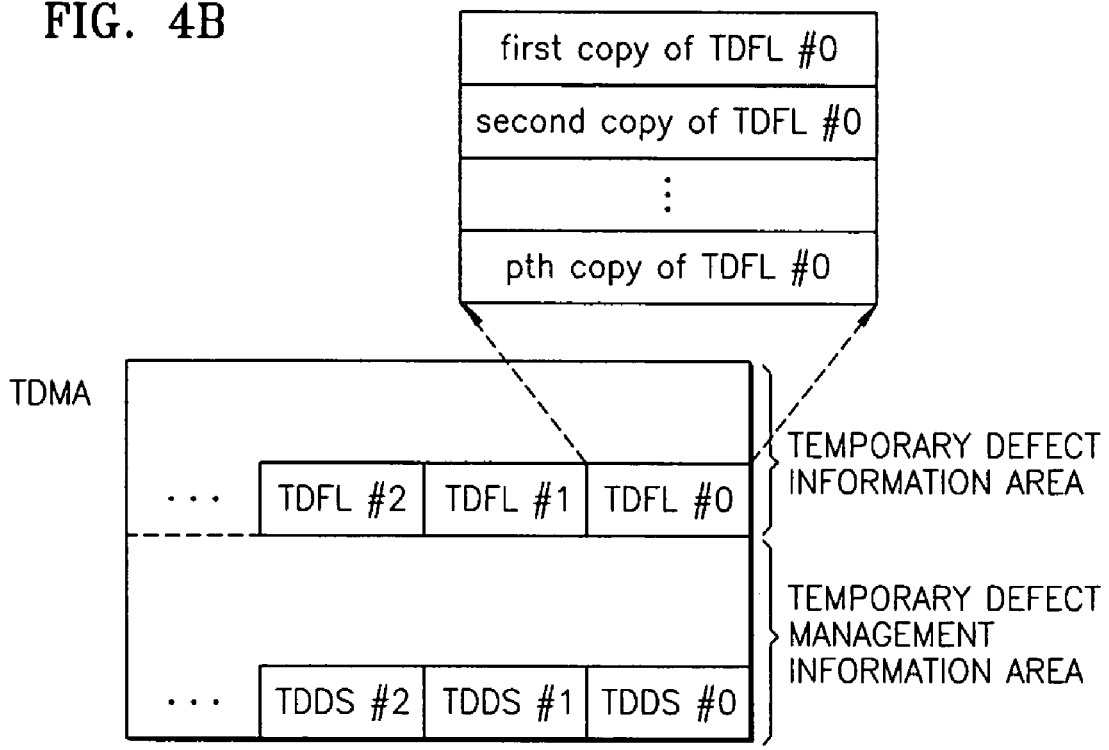

Referring to the embodiment shown in FIG. 4B, as compared to FIG. 4A, a DMA is also logically divided into a temporary defect information area and a temporary defect management information area, but the sequences of recording information are not the same as that shown in FIG. 4A. More specifically, in the temporary defect information area, temporary defect information TDFL #0, TDFL #1, TDFL #2 are sequentially recorded starting from an end of this area toward a start of this area. Similarly, the temporary defect information TDFL #0, TDFL #1, TDFL #2 are repeatedly recorded several times to increase the robustness of information.

In particular, FIG. 4B illustrates an embodiment in which the temporary defect information TDFL #0 is recorded P times. In the temporary defect management information area, temporary defect management information TDDS #0, TDDS #1, TDDS #2 is sequentially recorded starting from the end of this area. The temporary defect management information TDDS #0, TDDS #1, and TDDS #2 correspond to the defect information TDFL #0, TDFL #1, and TDFL #2, respectively.

Figure 4C:
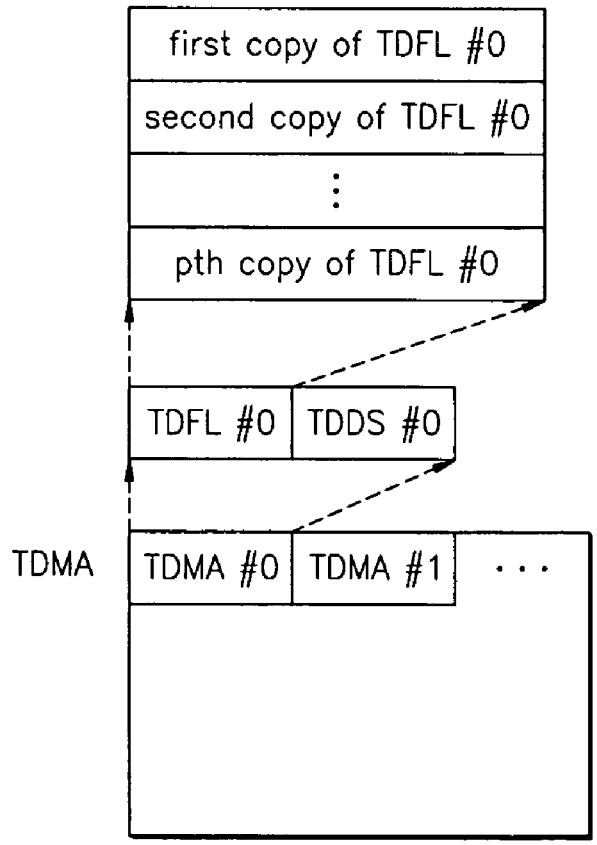

Referring to FIG. 4C, corresponding temporary defect information and temporary defect management information are recorded as pairs of information in a TDMA. More specifically, temporary management information TDMA #0, TDMA #1 are sequentially recorded starting from the start of the TDMA. The temporary management information TDMA #0 contains a pair of corresponding temporary defect management TDDS #0 and temporary defect information TDFL #0. Temporary management information TDMA #1 contains a pair of corresponding temporary defect management information TDDS #1 and temporary defect information TDFL #1. The temporary defect information TDFL #0, TDFL #1, TDFL #2 are repeatedly recorded several times to increase the robustness of the information. In particular, FIG. 4C illustrates recording of the temporary defect information TDFL #0 P times.

Figure 4D:
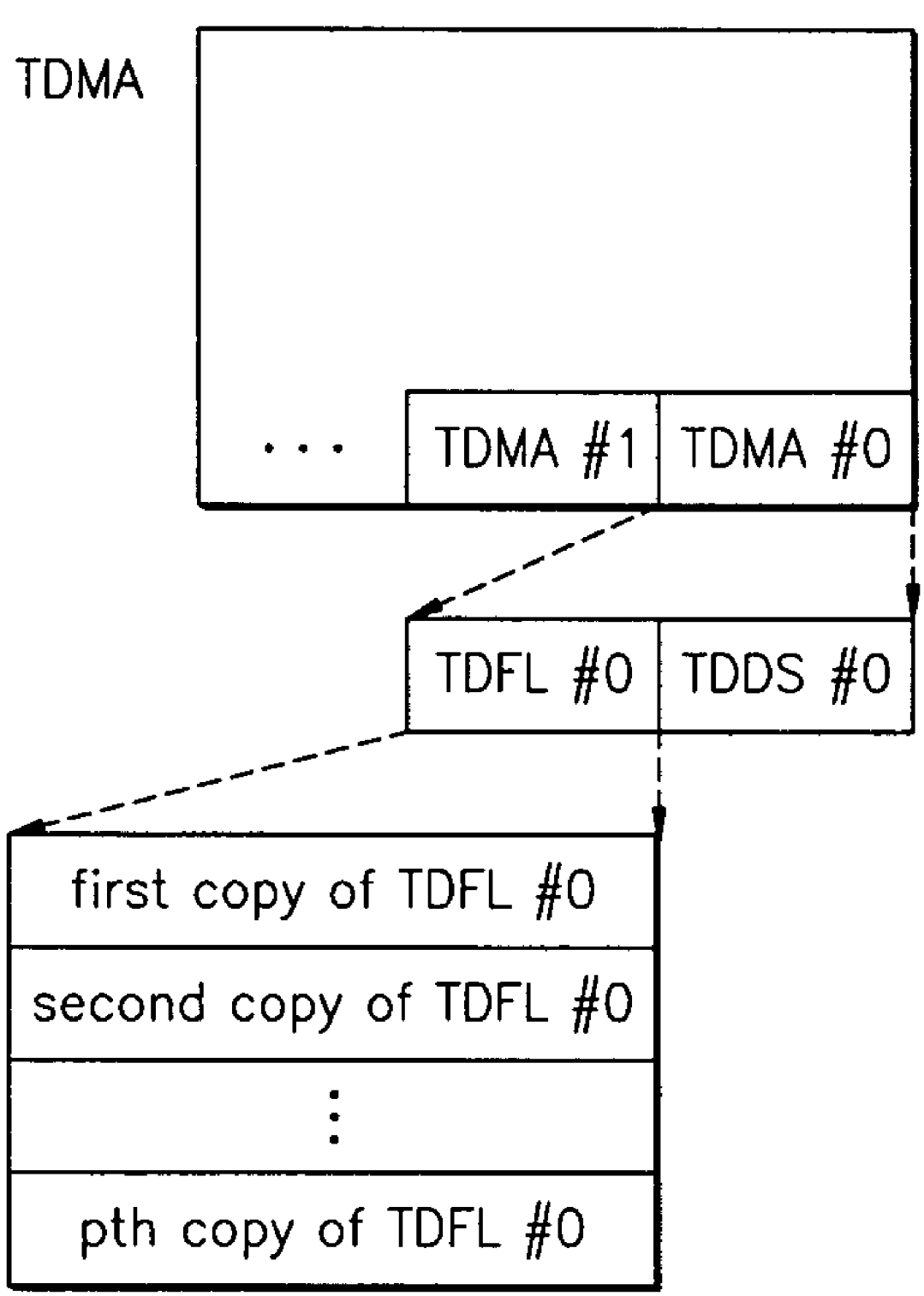

Referring to FIG. 4D, compared to the TDMA of FIG. 4C, corresponding temporary defect information and temporary defect management information are recorded as pairs of information in a TDMA, but the sequence of recording the information is not the same. More specifically, in the TDMA, temporary management information TDMA #0, TDMA #1 are sequentially recorded starting from an end of the TDMA. The temporary management information TDMA #0 contains a pair of corresponding temporary defect management information TDDS #0 and temporary defect information TDFL #0. The temporary management information TDMA #1 contains a pair of corresponding temporary defect management information TDDS #1 and temporary defect information TDFL #1. Similarly, the temporary defect information TDFL #0, TDFL #1, TDFL #2 are repeatedly recorded several times to increase the robustness of information. In particular, FIG. 4D illustrates recording of the temporary defect information TDFL #0 P times.

Figure 5A:
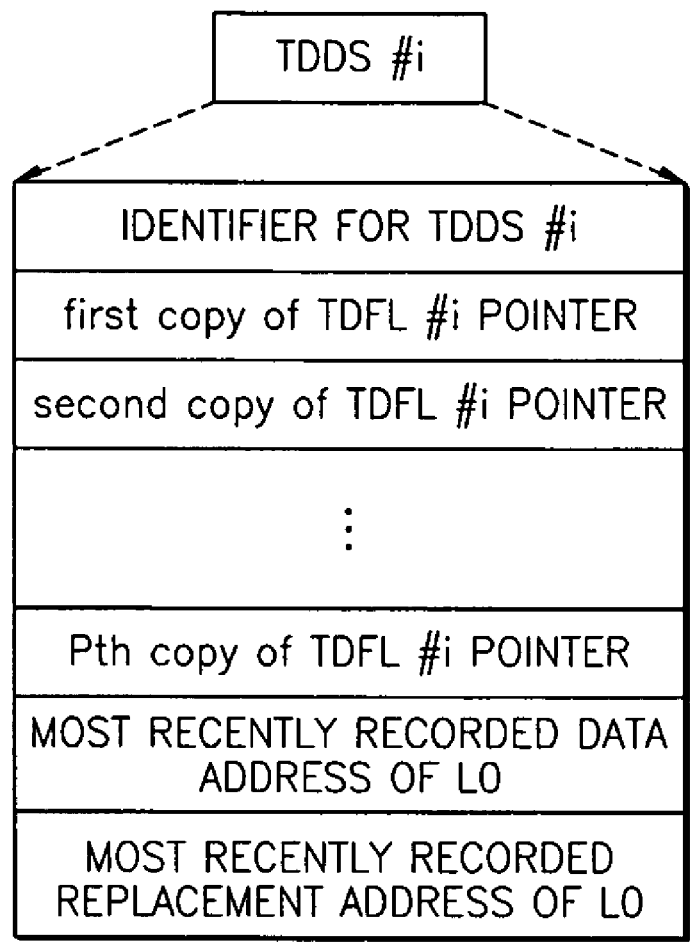
FIG. 5A illustrates a data structure of temporary defect information (TDFL) #i according to an embodiment of the present invention.
Figure 5B:
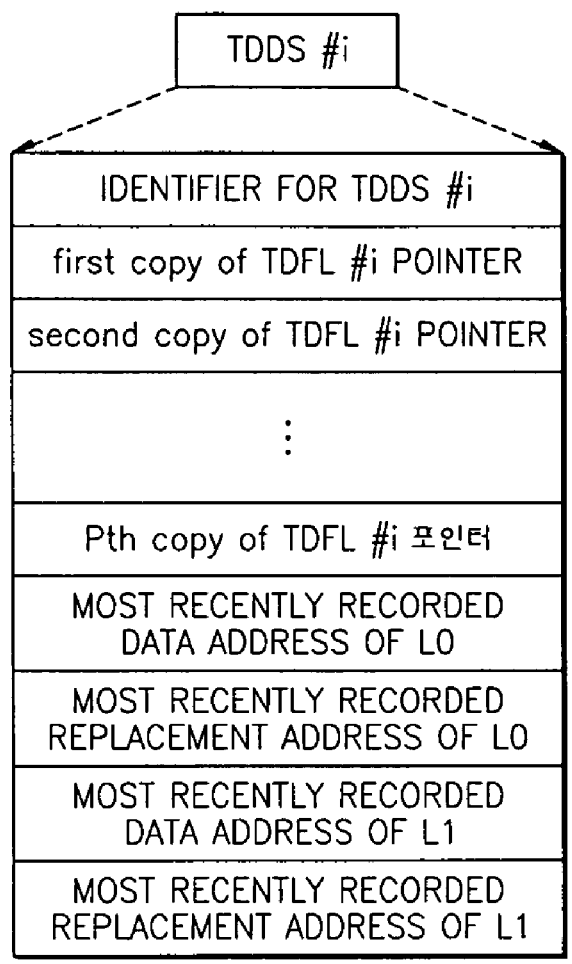
FIG. 5B illustrates a data structure of temporary defect information (TDFL) #i according to another embodiment of the present invention.

FIGS. 5A and 5B illustrate data structures of temporary defect management information TDDS #i. In detail, FIG. 5A illustrates a data structure of temporary defect management information TDDS #i recorded on a single record layer disc 100 such as that shown in FIG. 2A. The temporary defect management information TDDS #i contains an identifier for the temporary defect management information TDDS #i, and information regarding the position of corresponding temporary defect information TDFL #i.

As previously explained with reference to FIGS. 4A through 4D, temporary defect information TDFL #i according to an aspect of the present invention is repeatedly recorded several times. Accordingly, the information regarding the position of temporary defect information TDFL #i are recorded several times and includes pointers corresponding to temporary defect information TDFL #I. Each pointer points to the recording position of a corresponding copy of the temporary defect information TDFL #i. Temporary defect management information TDDS #i shown in FIG. 5A includes P pointers for temporary defect information TDFL #i recorded P times.

Also, the temporary defect management information TDDS #i recorded on a single record layer disc 100 such as that shown in FIG. 2A further describes an address of a last recorded user data, which is last recorded in a user data area of a record layer L0, and an address of a last recorded replacement data, which is last recorded in a spare area of the record layer L0. Accordingly, a user can easily utilize the disc 100 just by referring to the last recorded user data and replacement data.

FIG. 5B illustrates a data structure of temporary defect management information TDDS #i recorded on a double record layer disc 100 such as that shown in FIG. 2B. Temporary defect management information TDDS #i contains an identifier for temporary defect management information TDDS #i, and information regarding the recording position of corresponding temporary defect information TDFL #i. As previously mentioned with reference to FIGS. 4A through 4D, temporary defect information TDFL #i according to an aspect of the present invention is repeatedly recorded several times. Thus, the information regarding the recording position of temporary defect information TDFL #i which contains pointers pointing to the recording positions of respective temporary defect information TDFL #i, are recorded several times. In particular, temporary defect management information TDDS #i shown in FIG. 5B includes P pointers. Each pointer points to a corresponding copy of the of the temporary defect information TDFL #i.

Also, temporary defect management information TDDS #i recorded on a double record layer disc 100 such as that shown in FIG. 2B further describes an address of a last recorded user data that is last recorded in a user data area of a first record layer L0, the address of a last recorded replacement data that is last recorded in a spare area of the first record layer L0, an address of a last recorded user data that is last recorded in a user data area of a second record layer L1, and an address of a last recorded replacement data that is last recorded in a spare area of the second record layer L1. Accordingly, a user can easily utilize the disc 100 just by referring to the last recorded user data and last recorded replacement.

Figure 6:
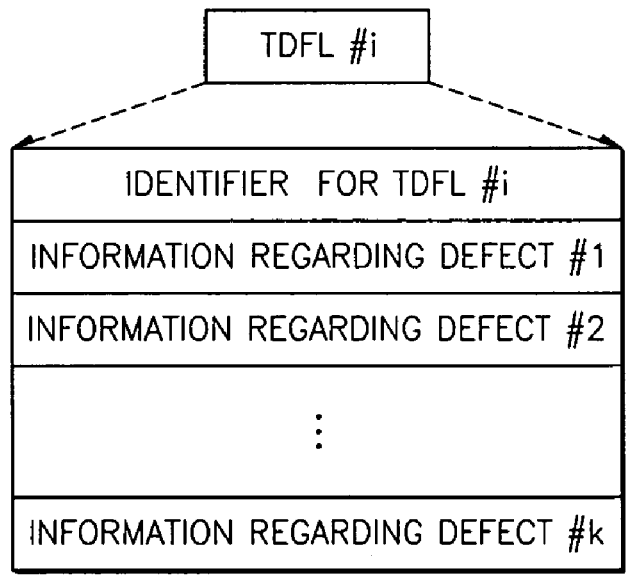
FIG. 6 illustrates a data structure of temporary defect management information (TDDS) #i according to an embodiment of the present invention.

FIG. 6 illustrates a data structure of temporary defect information TDFL #I according to an aspect of the invention. Referring to FIG. 6, temporary defect information TDFL #i contains an identifier for temporary detect information TDFL #i, and information regarding defects #1, #2 nd #K. The information regarding defects #1, #2 nd #K comprises state information indicating the positions of the defects and the replacements, and whether a defective area is a single defect block or a continuous defect block.

Generally, data can be processed in units of sectors or clusters. A sector denotes a minimum unit of data that can be managed in a file system of a computer or in an application. A cluster denotes a minimum unit of data that can be physically recorded on a disc 100 at once. In general, one or more sectors constitute a cluster.

There are two types of sectors: a physical sector and a logical sector. The physical sector is an area on the disc 100 where a sector of data is to be recorded. An address for detecting the physical sector is called a physical sector number (PSN). The logical sector is a unit in which data can be managed in a file system or an application. An address for detecting the logical sector is called a logical sector number (LSN). A disc recording/reading apparatus such as that in FIG. 1 detects the recording position of data on the disc using a PSN. In a computer or an application relating to data, the entire data is managed in units of LSNs and the position of data is detected using an LSN. The relationship between an LSN and a PSN is changed by a controller 2 of the recording/reading apparatus, based on whether the disc 100 contains a defect and an initial position of recording data.

Figure 7:
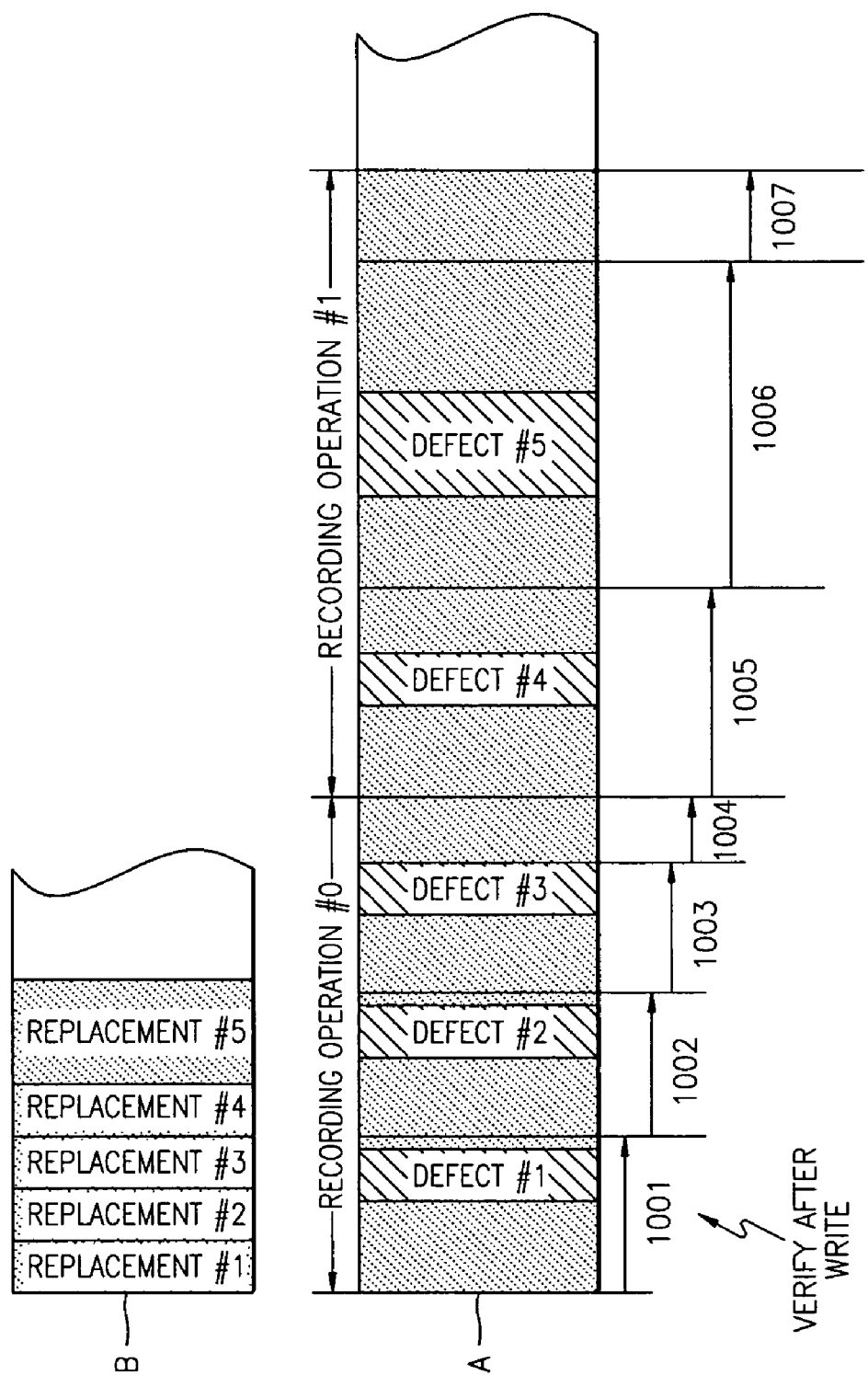
FIG. 7 illustrates diagrams explaining recording of data in a user data area A and a spare area B, according to an embodiment of the present invention.

Referring to FIG. 7, the disc 100 includes a user data area A and a spare area B in which PSNs are sequentially allocated to a plurality of sectors (not shown) according to an aspect of the invention. In general, each LSN corresponds to at least one PSN. However, since LSNs are allocated to non-defective areas, including replacements recorded in the spare area B, the correspondence between the PSNs and the LSNs is not maintained when the disc 100 has a defective area, even if the size of a physical sector is the same as that of a logical sector.

In the user data area A, user data is recorded either in a continuous recording mode or a random recording mode. In the continuous recording mode, user data is recorded sequentially and continuously. In the random recording mode, user data is randomly recorded. In the data area A, sections 1001 through 1007 denote predetermined units of data in which the verify-after-write method is performed. A recording and/or reproducing apparatus such as that shown in FIG. 1 records user data in section 1001, returns to the start of section 1001, and checks if the user data is appropriately recorded or a defect exists in section 1001. If a defect is detected in a portion of section 1001, the portion is designated as defect #1. The user data recorded in defect #1 is also recorded on a portion of the spare area B so as to provide replacement data for a portion of the user data which was recorded in the defect #1 area. Here, the portion of the spare area B in which data recorded in defect #1 is rewritten is called replacement #1. Next, the recording apparatus records user data in section 1002, returns to the start of section 1002, and checks whether the data is properly recorded or a defect exists in section 1002. If a defect is detected in a portion of section 1002, the portion is designated as defect #2. Likewise, replacement #2 corresponding to defect #2 is formed in the spare area B. Further, defect #3 and replacement #3 are designated in section 1003 of the user data area A and the spare area B, respectively. In section 1004, a defect does not occur and a defective area is not designated.

The recording and/or reproducing apparatus records information regarding defect #1, #2, and #3 occurring in sections 1001 through 1003 as temporary defect information TDFL #0 in a TDMA, when recording operation #0 is expected to end, after the recording and verifying of data to section 1004 (i.e., when a user presses the eject button of a recording apparatus or recording of user data allocated in a recording operation is complete). Also, management information for managing temporary defect information TDFL #0 is recorded as temporary defect management information TDDS #0 in the TDMA.

When recording operation #1 starts, data is recorded in sections 1005 through 1007 and defects #4 and #5 and replacements #4 and #5 are formed in the user data area A and the spare area B, respectively, as explained in sections 1001 through 1004. Defects #1, #2, #3, and #4 occur in the single blocks, whereas defect #5 occurs in is a continuous defect block. Replacement #5 is a continuous replacement block that is replacement data for the user data recorded in defect #5. According to an aspect of the invention, a block refers to a physical or logical record unit, a range of a unit block not being limited. If the second recording operation is expected to end, the recording apparatus records information regarding defects #4 and #5 as temporary defect information TDFL #1, and records the information contained in the defect information DFL #1 once again. Thereafter, management information for managing temporary defect information TDFL #1 is recorded as temporary defect management information #1 in the TDMA.

Figure 8:
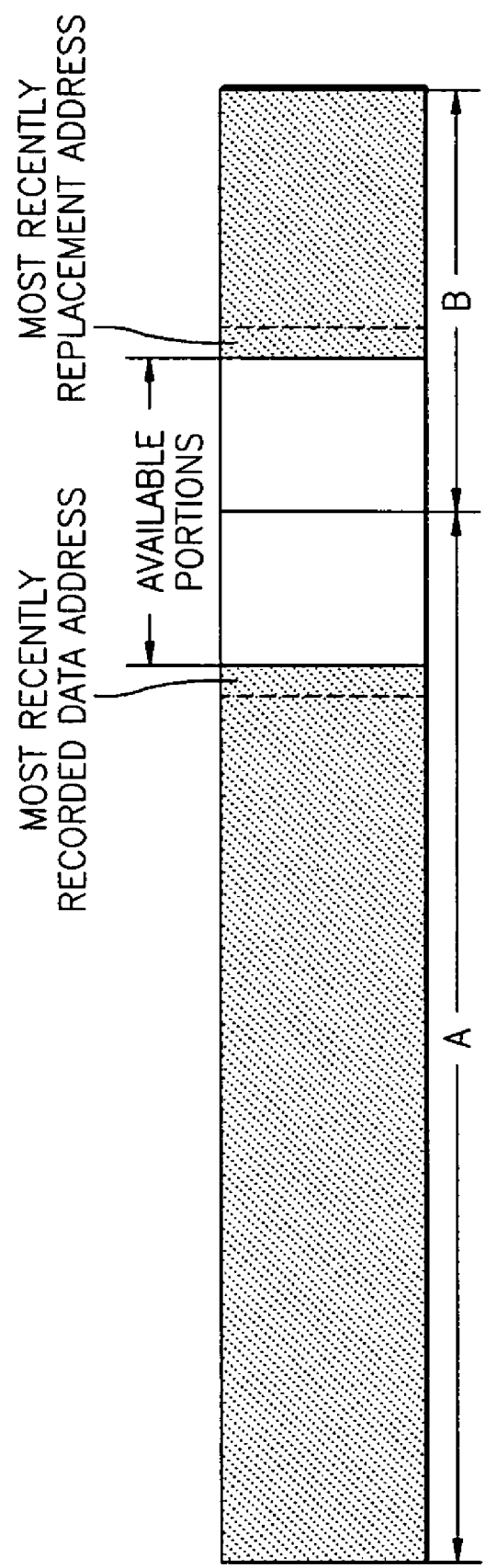
FIG. 8 is a diagram illustrating effective use of a data area according to an embodiment of the present invention.

FIG. 8 is a diagram illustrating effective use of a user data area according to an aspect of the present invention. FIG. 8 shows that an available portion of a user data area can easily be detected with an address of user data that is last recorded in the user data area A and an address of replacement that is last recorded in the spare area B. Specifically, the available portion can be more easily detected, when the user data is recorded from the inner part/outer part of the user data area A to its outer part/inner part and data, which is replacement data for a defect occurring in the user data area A, is recorded from the outer part/inner part of the spare area to its inner part/outer part, respectively. In other words, the user data and the replacement data are preferably recorded in the opposite recording directions according to an aspect of the invention.

For a disc 100 such as that shown in FIG. 2B, when physical addresses of user data are increased from the inner part of the first record layer L0 to the outer part and increased from the outer part of the second record layer L1 to the inner part, a physical address of the last data, which is last recorded in the corresponding user data areas A of the record layers L0 and L1, has the largest number. Also, last recorded replacement data has a physical address with the smallest number, when physical addresses of replacements are reduced from the outer part to the inner part in the spare area B of the first record layer L0 and increased from the inner part to the outer part in the spare area B of the second record layer L1. Accordingly, as previously mentioned, if the addresses of the last recorded data and last recorded replacement data are included in the temporary defect management information TDDS #i, it is possible to detect the positions of data and the replacement data that are to be newly recorded, without completely reading the temporary defect information TDFL #i and estimating the positions of the defect and the replacement data. Further, available portions of the user data area A and the spare area B are located continuously, thereby enabling effective use of the user data area A.

Figure 9A:
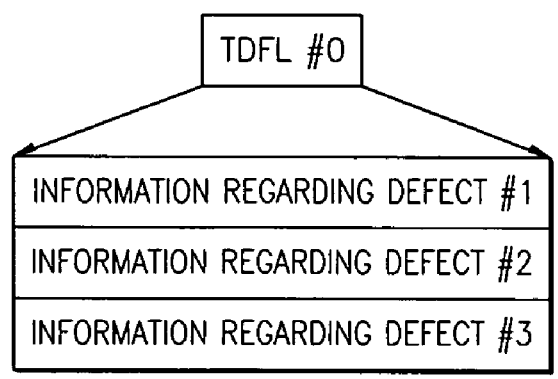
FIGS. 9A and 9B illustrate data structures of TDFL #1 and TDFL #2 recorded according to the recording of data shown in FIG. 7.
Figure 9B:
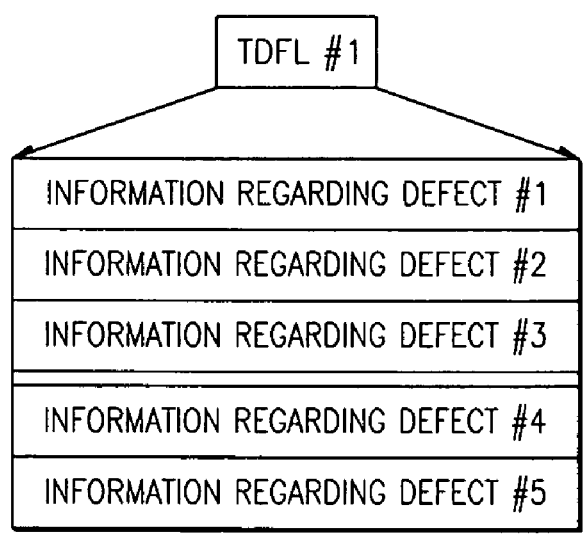
Figure 10:
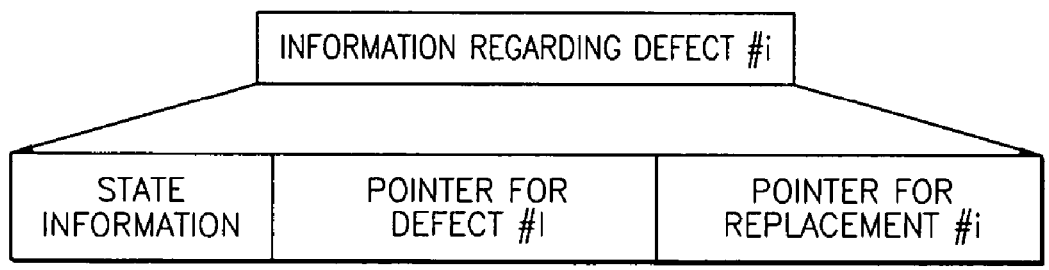
FIG. 10 illustrates a data structure of information regarding defect #i.

FIGS. 9A and 9B illustrate data structures of temporary defect information TDFL #0 and TDFL #1 recorded as explained with respect to FIG. 7. FIG. 10 illustrates a data structure of information regarding defect #i recorded as explained with reference to FIG. 7.

Referring to FIGS. 9A and 9B, temporary defect information TDFL #0 contains information regarding defects #1, #2, and #3. The information regarding defect #1 indicates a position of an area in which the defect #1 exists and a position of an area in which the replacement #1 is recorded. The information regarding the defect #1 may further include information indicating whether the defect #1 is a continuous defect block or a single defect block. Likewise, the information regarding the defect #2 indicates whether the defect #2 is a continuous defect block or a single defect block, a position of an area in which the defect #2 exists and a position of an area in which the replacement #2 is recorded. The information regarding the defect #3 indicates whether the defect #3 is a continuous defect block or a single defect block, a position of an area in which the defect #3 exists, and a position of an area in which the replacement #3 is recorded.

Temporary defect information TDFL #1 further contains information regarding the defects #4 and #5 in addition to the information contained in the temporary defect information TDFL #0. More specifically, the temporary defect information TDFL #1 includes the information regarding the defect #1, the information regarding the defect #2, the information regarding the defect #3, the information regarding the defect #4, and the information regarding the defect #5.

Referring to FIG. 10, the information regarding a defect #i includes state information indicating whether the defect #i is a continuous defect block or a single defect block, a pointer pointing to the defect #i, and a pointer pointing to a corresponding replacement #i. When the defect #i is determined to be in a continuous defect block, the state information further represents whether a pointer for the defect #i points to the start or end of the continuous defect block and whether a pointer for the replacement #i points to the start or end of a replacement block that replaces the defect #i. When the state information indicates the pointer for defect #i as the start of the continuous defect block and the pointer for the replacement #i as the start of the replacement block, the pointer for the defect #i represents a starting physical sector number of the continuous defect block and the pointer for the replacement #i represent a starting physical sector number of the replacement #i.

In contrast, when the state information indicates the pointer for the defect #i as the end of the continuous defect block and the pointer for the replacement #i as the end of the replacement block, the pointer for the defect #i represents an ending physical sector number of the continuous defect block and the pointer for the replacement #i represent an ending physical sector number of the replacement #i. The definition of a continuous defect block using state information enables effectively recording of information and saves a space of recording, even if information regarding defects is not recorded in units of blocks.

The pointer for the defect #i specifies a starting point and/or ending point of the defect #i. The pointer for the defect #i may include a starting PSN of the defect #I according to an aspect of the invention. The pointer for the replacement #i specifies a starting and/or ending points of the replacement #i. The pointer for the replacement #i may also include a starting PSN of replacement #I according to an aspect of the invention.

Hereinafter, a disc defect management method according to embodiments of the present invention will be described with reference to the accompanying drawings with reference to FIGS. 11 and 12.

Figure 11:
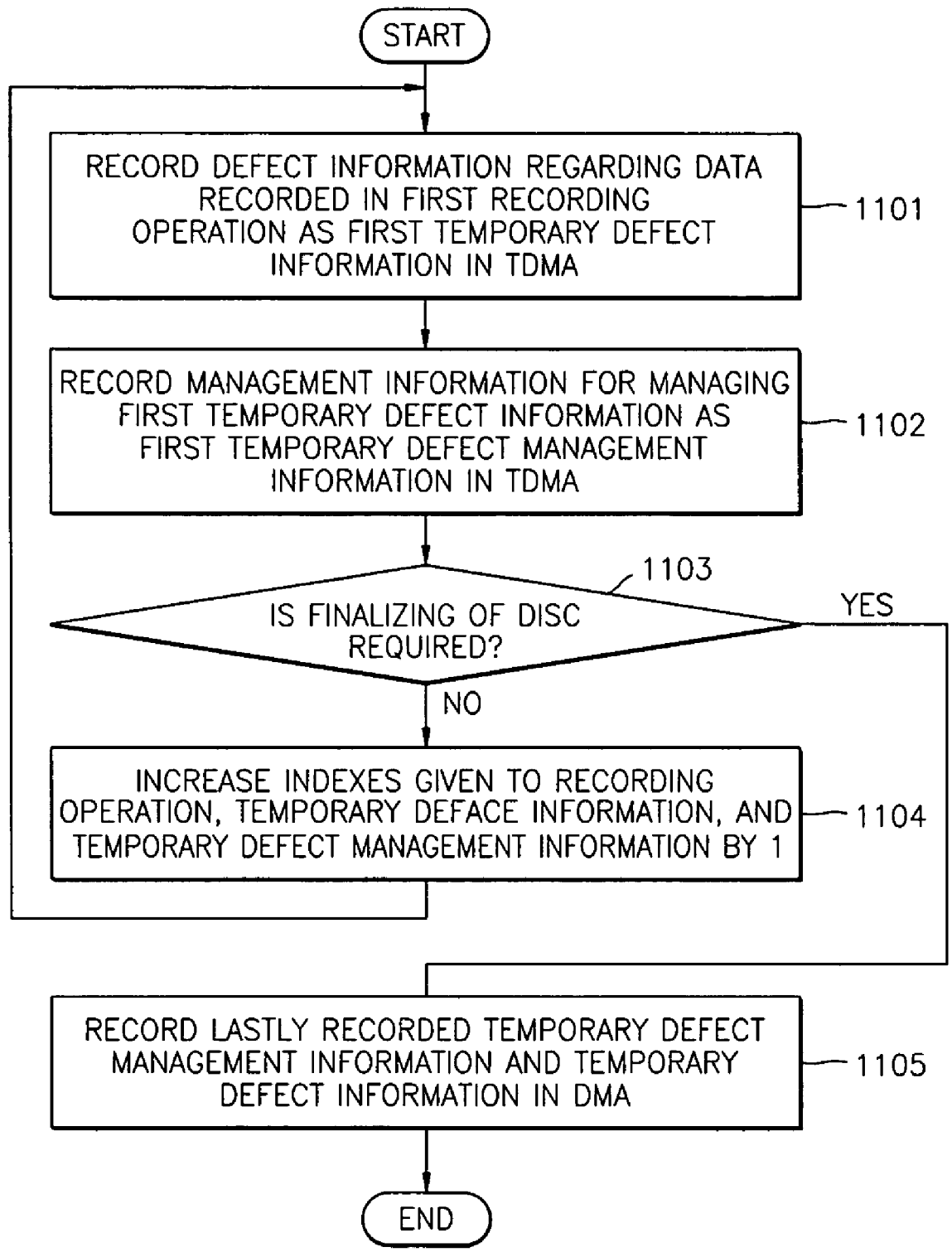
FIG. 11 is a flowchart illustrating a disc defect management method according to an embodiment of the present invention.

FIG. 11 is a flowchart illustrating a disc defect management method according to an embodiment of the present invention. In action 1101, a recording apparatus records defect information regarding data, which is recorded according to a first recording operation, as first temporary defect information in a TDMA of a disc. This process serves to manage disc defects. In action 1102, the recording apparatus records management information for managing the first temporary defect information as first temporary defect management information in the TDMA.

In action 1103, it is checked whether finalization of the disc is required. In action 1104, if it is determined in action 1103 that the finalization of the disc is not required, actions 1101 and 1102 are repeated while increasing an index given to each recording operation, temporary defect information, and temporary defect management information by 1. However, it is understood that other numbers can be used for the index to the extent that the numbers serve to distinguish sets of recorded data.

If it is determined in action 1103 that finalization of the disc is required, a last recorded temporary defect management information and a last recorded temporary defect information are recorded in a DMA (action 1105). That is, the last recorded temporary defect management information and the last recorded temporary defect information are recorded as the final defect management information and defect information in the DMA, respectively. The final defect information and defect management information may be repeatedly recorded to increase the reliability of data detection.

Further, according to an aspect of the invention, the verify-after-write method may be performed on the final temporary defect management information and temporary defect information. If a defect is detected from this information, an area of the disc having the defect and the following area containing data may be regarded as being unavailable (i.e., they are designated as a defective area), and the final temporary defect management information and temporary defect information may be again recorded after the defective area.

Figure 12:
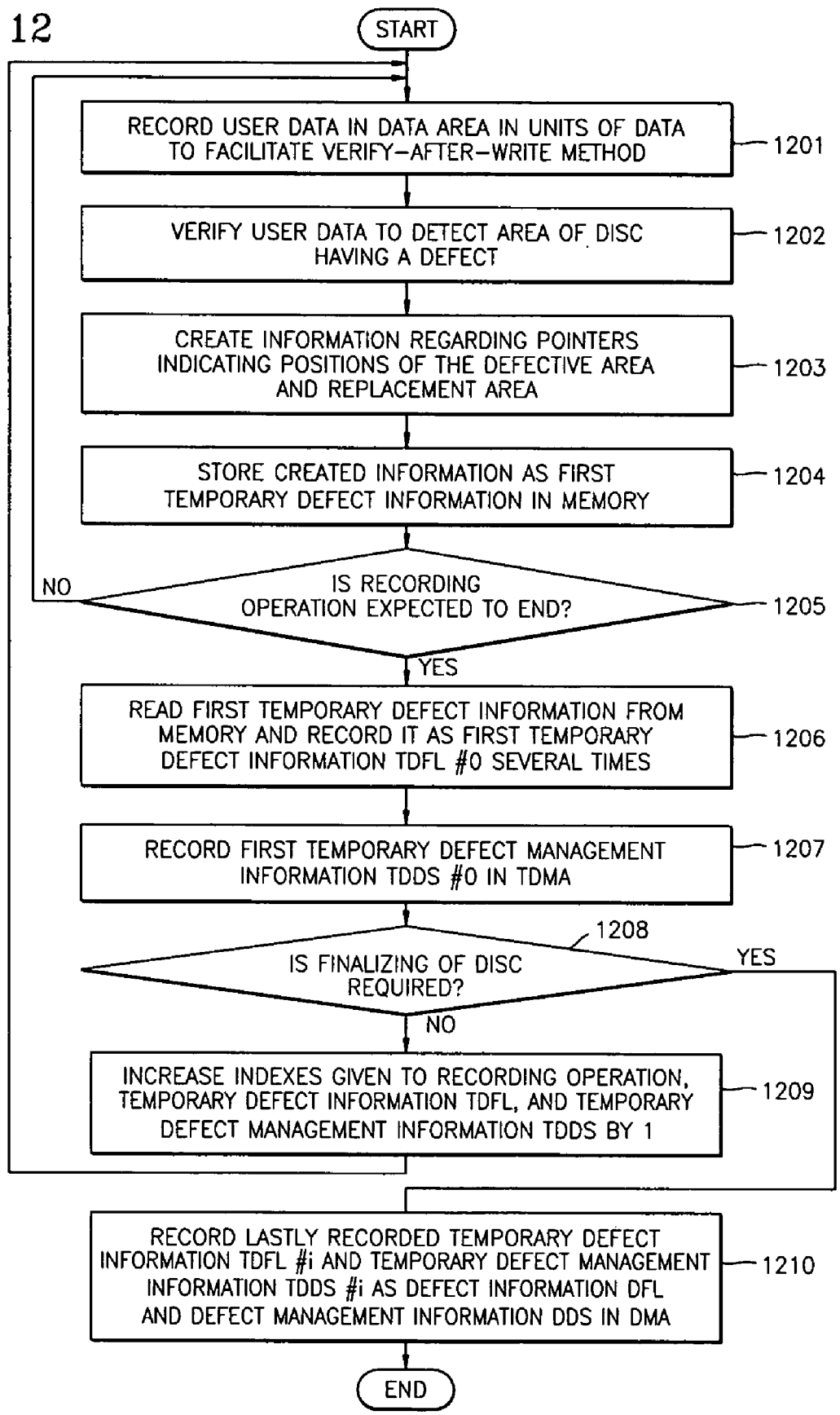
FIG. 12 is a flowchart illustrating a disc defect management method according to another embodiment of the present invention.

FIG. 12 is a flowchart illustrating a disc defect management method according to another embodiment of the present invention. In action 1201, a recording apparatus records user data in a data area of a disc in units of data to facilitate the verify-after-write method. In action 1202, the data recorded in action 1201 is verified to detect an area of the disc having a defect. In action 1203, the controller 2 of FIG. 1 designates the area having the defect as a defective area, controls the recording/reading unit 1 to rewrite data recorded in the defective area to a spare area so as to create a replacement area, and creates state information specifying whether the defective area is a single defect block or a continuous defect block, and pointer information that points to the positions of the defective area and the replacement area. In action 1204, the state information and the pointer information are stored as first temporary defect information.

In action 1205, it is checked whether the first recording operation is expected to end. If it is determined in action 1205 that the first recording operation is not expected to end, actions 1201 through 1204 are repeated. In action 1206, if it is determined in action 1205 that the first recording operation is likely to end (i.e., when the recording of the user data is complete by user input or according to the first recording operation), the stored temporary defect information is read and repeatedly recorded as first temporary defect information TDFL #0 in a TDMA several times. In action 1207, management information for managing the first temporary defect information TDFL #0 is recorded as first temporary defect management information TDDS #0 in the TDMA.

In action 1208, it is checked whether the data needs to be finalized. If it is determined in action 1208 that finalization of the disc is not required, actions 1201 through 1207 are repeated. In action 1209, whenever actions 1201 through 1207 are repeated, an index given to a corresponding recording operation, temporary defect information TDFL, and temporary defect management information TDDS is increased by 1. However, it is understood that other numbers can be used for the index to the extent that the numbers serve to distinguish sets of recorded data.

In action 1210, if it is determined in action 1208 that the finalization of the disc is needed, a last recorded temporary defect information TDFL #i and a last recorded temporary defect management information TDDS #i are recorded as the final defect information DFL and the final defect management information DDS in the DMA. Recording of the final defect information DFL and the final defect management information DDS may be repeated several times to increase the reliability of data detection. Similarly, the verify-after-write method may be performed on the final defect information and defect management information. If a defect is detected in this information, an area of the disc having the defect and the following area containing data may be regarded as being unavailable (i.e., they are designated as a defective area), and the final temporary defect management information and temporary defect information may be again recorded after the defective area.

The aforementioned defect management may be embodied as a computer program that can be run by a computer, which can be a general or special purpose computer. Thus, it is understood that the controller 2 can be such a computer. Codes and code segments, which constitute the computer program, can be easily reasoned by a computer programmer in the art. The program is stored in a computer readable medium readable by the computer. When the program is read and run by a computer, the defect management is performed. Here, the computer-readable medium may be a magnetic recording medium, an optical recording medium, a carrier wave, firmware, or other recordable media.

In addition, it is understood that, in order to achieve a recording capacity of several dozen gigabytes, the recording and/or reproducing unit 1 could include a low wavelength, high numerical aperture type unit usable to record dozens of gigabytes of data on the disc 100. Examples of such units include, but are not limited to, those units using light wavelengths of 405 nm and having numerical apertures of 0.85, those units compatible with Blu-ray discs, and/or those units compatible with Advanced Optical Discs (AOD).

As described above, the present invention provides a disc defect management method that is applicable to write-once discs. According to the present invention, at least one temporary defect information area is present in a lead-in area of a disc and/or a lead-out area, so that information regarding a defect that exists in the disc can be accumulatively recorded. Also, it is easy to finalize the disc by reading only lastly recorded temporary defect information from a temporary defect information area and recording the read information in a defect management area, thereby enabling effective use of the DMA. Accordingly, user data can be recorded even on write-once discs while performing disc defect management, thereby performing backup operations more stably without interruptions.

While described in terms of use with write-once disks, it is understood that the present invention can be used with other writeable discs, including re-writeable recording media.

While this invention has been particularly shown and described with reference to preferred embodiments thereof, it will be understood by those skilled in the art that various changes in form and details may be made therein without departing from the spirit and scope of the invention as defined by the accompanying claims and equivalents thereof.

What is claimed is:

1. A write-once disc for use with a recording and/or reproducing apparatus, the write-once disc comprising:
    a user data area in which user data is recorded;
    a spare area other than the user data area and which comprises a substitute area for a defective area existing in the user data area;
    a temporary defect management area which comprises temporary defect information and temporary defect management information recorded for a recording operation for use by the recording and/or reproducing apparatus to perform disc defect management; and
    a defect management area other than the temporary defect management area which is management information,
    wherein:
        the temporary defect management information comprises information on a recording position of the temporary defect information, and the temporary defect information comprises a defect position pointer that points to a position of a defective area in the user data area and a replacement position pointer that points to a position of the replacement data that replaces a portion of the user data recorded in the defective area.

2. The write-once disc of claim 1, wherein the temporary defect information further comprises state information that specifies a state of the defective area.

3. The write-once disc of claim 1, wherein the write-once disc has a property which prevents, after the data is recorded on any area of the disc, new data from being written to the area of the disc.

4. An apparatus for use with a write-once disc having a user data area, a temporary defect management area, a defect management area other than the temporary defect management area, and a spare area other than the user data area, the apparatus comprising:

a reading unit that reads data from the disc, the disc being the write-once disc; and a controller that controls the reading unit to read temporary defect information and temporary defect management information in the temporary defect management area of the disc, wherein the temporary defect management information comprises information on a recording position of the temporary defect information, the temporary defect information comprises a defect position pointer that points to a defective area and a replacement position pointer that points to the position of replacement data, and the defect management area is reserved for recording the temporary defect information and temporary defect management information.

5. The apparatus of claim 4, wherein the write-once disc has a property which prevents, after the data is recorded on any area of the disc, new data from being written to the area of the disc.

* * * * *

UNITED STATES PATENT AND TRADEMARK OFFICE
CERTIFICATE OF CORRECTION

PATENT NO. : 7,372,793 B2  
APPLICATION NO. : 11/045149  
DATED : May 13, 2008  
INVENTOR(S) : Sung-hee Hwang et al.

Page 1 of 1

It is certified that error appears in the above-identified patent and that said Letters Patent is hereby corrected as shown below:

Column 14, line 63, insert --reserved for the apparatus to record the temporary defect information and the temporary defect-- after "is".

Signed and Sealed this

Nineteenth Day of August, 2008

JON W. DUDAS  
*Director of the United States Patent and Trademark Office*